May 25, 1954  R. ANNEN  2,679,440
DEVICE FOR PIVOTALLY MOUNTING THE WINDING WEIGHT OF A
SELF-WINDING MECHANISM IN MOVEMENTS FOR TIMEPIECES
Filed Dec. 17, 1948
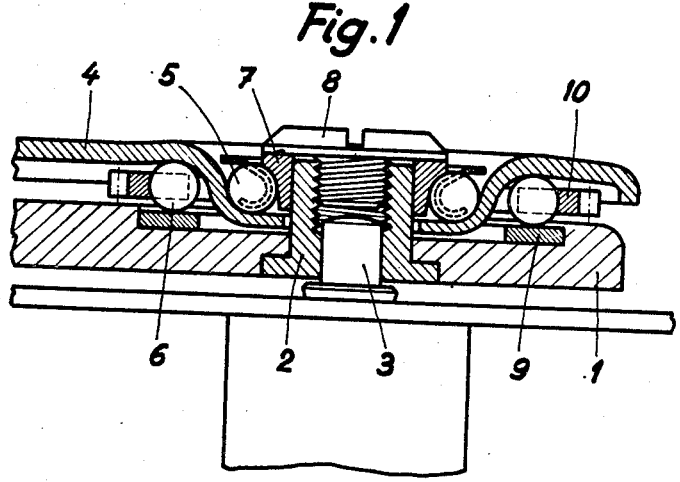
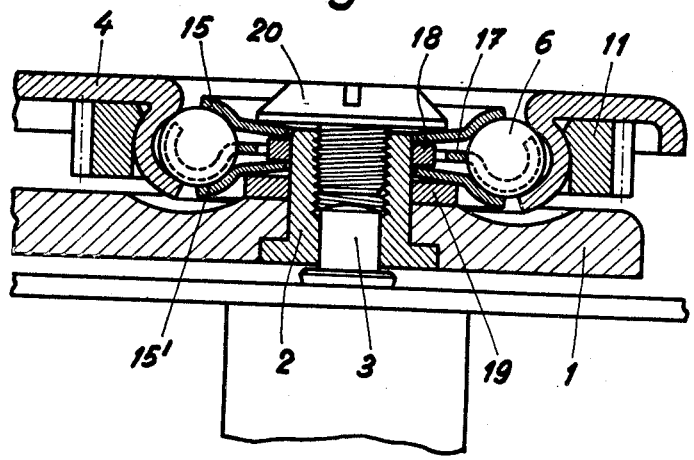
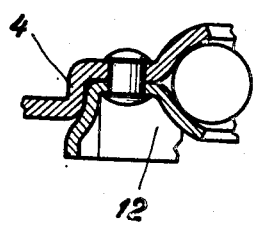

Patented May 25, 1954

2,679,440

UNITED STATES PATENT OFFICE 2,679,440

DEVICE FOR PIVOTALLY MOUNTING THE WINDING WEIGHT OF A SELF-WINDING MECHANISM IN MOVEMENTS FOR TIME-PIECES

Robert Annen, Bienne, Switzerland, assignor to Roulements à Billes Miniatures S. A., Bienne, Switzerland Application December 17, 1948, Serial No. 65,936

Claims priority, application Switzerland February 5, 1948

1 Claim. (Cl. 308—183)

This invention relates to devices for pivotally mounting the winding weights in self-winding mechanisms of movements for time pieces, such as watches, clocks, etc.

For this purpose radial ball bearings have already been used in the prior art. There were, however, two difficulties in the use of such bearings, viz.: the bearings were too expensive, and, even at the smallest radial play possible, an inadmissible rocking of the winding weights occured parallel to their axes of rotation.

The object of the invention is to remedy these inconveniences.

Another object of the invention is to provide an arm carrying the winding weight, said arm constituting at least one raceway or zone for the bearing balls.

Other objects and features will be apparent as the following description proceeds, reference being had to the accompanying drawing, wherein:

Fig. 1 is a partial sectional view through the axis of oscillation of an oscillatory winding weight, Fig. 2 is a similar view of a second example, and Fig. 3 is a sectional view of a detail of a third embodiment.

Referring now to Fig. 1 of the drawing, I designates a bridge of a watch or clock movement, such as the bridge of the center wheel, for instance. On this bridge a stud 2 is mounted coaxially to the center wheel, this stud carrying the inner racering 7 of the centering oblique ball bearing 5. The pivot 3 of the center wheel is rotatably mounted on the stud 2. The screw 8 serves the purpose of adjusting the play of both the ball bearing 5 and the ball bearing 6 described later on. After play adjustment, the screw 8 may be locked by means of any suitable adhesive, such as glue, for instance.

The arm 4 carrying the oscillatory winding weight not shown is shaped so as to form a raceway both for the balls of the bearing 5 and those of the bearing 6. This arm 4, after having been machined or mechanically treated in any other suitable way, has been heat-treated, such as hardened for instance. The lower race member of the balls of the bearing 6 is constituted by a washer 9 set into the bridge I. The raceway on this washer 9, that is, the surface contacting the balls of the bearing 6 has been hardened and afterwards polished.

The ball cage 10 of the bearing 6 forms a driving member of the winding mechanism for the mainspring. By this member 10 a reduction ratio of 1:2 is obtained for the winding speed, for it is a well-known fact that the speed of the ball cage amounts to half the speed of the outer racering, i. e., in the embodiment shown, of the arm 4. According to the requirements, the cage 10 may be a cam disc, a ratchet wheel, or any other suitable drive means.

The stud 2 might eventually be omitted, and the inner racering 7 directly mounted on an extension of the pivot 3 of the center wheel. However, in this case, the shoulder of the pivot 3 would be supported on the bridge I at a pressure equal to that component of the oscillatory weight which is parallel to the pivoting axis. The friction called forth thereby would, however, be of no detrimental influence on the running of the watch or clock.

The embodiment shown in Fig. 2 is in so far simpler than the example of Fig. 1, as there is but one bearing, the balls of which are supported on four points, and all parts, except the balls, are made by pressing so that they are very cheap. Here too, a stud 2 is provided on which the inner racerings 15 and 15' and the washers 18 and 19 are mounted. The outer race member for the balls of the bearing 6 is made in one piece with the arm 4 of the winding weight. After thermal treatment, i. e., after the arm 4 having been finished, the cage 17 and the balls are being mounted on the arm 4 by pressing the balls one after another between the lips of the cage 17, the latter having been submitted to hardening and subsequent drawing in order to obtain the ductility desired.

The screw 20 serves the purpose of fixing the parts 15, 15', 18 and 19 to the stud 2 and of adjusting as small a play as possible in order to avoid rocking of the oscillatory winding weight in axial direction. The screw 20 is automatically locked by the ductility of the inner race rings 15 and 15'.

The winding member 11 is pressed upon the outer race member 4, so that it is held thereon by elastic pressure.

Referring to Fig. 3 showing a modification of the device illustrated in Fig. 2, the arm 4 forms the outer, upper raceway for the balls of the bearing. A part 12 fixed to the arm 4 serves as the lower, outer raceway and also as a winding member (cam disc, ratchet wheel etc.).

The examples shown are especially distinguished by small width and good stiffness.

While I have described and illustrated three embodiments of my invention, I do not wish to unnecessarily limit the scope of this invention, but reserve the right to make such modifications and rearrangements of the several parts as may come within the purview of the accompanying claim:

What I claim is:

A device for pivotally mounting the winding weight of a self-winding time piece comprising, in combination, a hollow internally threaded, fixedly mounted stud; a first race member mounted about said stud; a plurality of ball members mounted in contact with said first race member; a second race member mounted about said stud concentrically with said first race member and laterally spaced therefrom, said second race member being in the form of an annular ring having a flat ball supporting surface; a plurality of ball members mounted in contact with said second race member on said ball supporting surface thereof; cage means for maintaining said last-mentioned plurality of ball members in spaced relation to each other and for confining them to said ball supporting surface of said second race member; a part of resilient sheet metal adapted to be connected to a winding weight and having an opening formed therein, said stud being located within said opening, and said part being bent at the portion thereof adjacent to said opening so as to form a race way for said first-mentioned plurality of ball members on one surface of said part and so as to form a race way for said second mentioned plurality of ball members on the other surface of said part, said bent portion of said part being located between said first and second race members and in contact with said first and second mentioned plurality of ball members, respectively, whereby said ball members serve to pivotally mount and center said part about said stud; and a screw member threadedly engaging said stud and having a head located in contact with said first race member, whereby said screw member may be turned to adjust the contact pressure between said race members and ball members and whereby said resilient bent portion of said part effectively eliminates play between said ball members and race members without undesirably increasing the pressure on said ball members.

References Cited in the file of this patent

UNITED STATES PATENTS

| Number | Name | Date |
| --- | --- | --- |
| 728,132 | Reid | May 12, 1903 |
| 910,900 | Brown | Jan. 26, 1909 |
| 959,125 | Edlund | May 24, 1910 |
| 1,036,569 | Colegrove | Aug. 27, 1912 |
| 1,769,933 | Arutunoff | July 8, 1930 |
| 1,794,622 | Jacot | Mar. 3, 1931 |
| 2,028,964 | Annen | Jan. 28, 1936 |
| 2,399,131 | Matter | Apr. 23, 1946 |

FOREIGN PATENTS

| Number | Country | Date |
| --- | --- | --- |
| 367,572 | France | Nov. 6, 1906 |
| 746,608 | France | Mar. 14, 1933 |